United States Patent Office

3,479,343
Patented Nov. 18, 1969

3,479,343
NOVEL CARBAZATES
James D. Johnston, New London, Conn., assignor to Chas. Pfizer & Co., Inc., New York, N.Y., a corporation of Delaware
No Drawing. Continuation-in-part of application Ser. No. 3,984, Jan. 22, 1960. This application Jan. 9, 1961, Ser. No. 76,088
Int. Cl. C09b 23/00; C07d 5/16
U.S. Cl. 260—240    10 Claims

ABSTRACT OF THE DISCLOSURE

New carbazates useful as antimicrobial agents; especially the β-hydroxyethyl-, β-chloroethyl- and β-acetoxyethyl-5-nitro-2-furfurylidene carbazates.

---

The present application is a continuation-in-part of application Ser. No. 3,984 filed Jan. 22, 1960, now abandoned.

This invention is concerned with novel antimicrobial agents and more particularly with a series of carbazate compounds which exhibit valuable activity against a variety of microorganisms.

A group of new and valuable carbazate compounds has been discovered, the members of which are remarkably effective antimicrobial agents, showing activity against a variety of microorganisms, among them organisms which cause disease in animals, including man. These new compounds have the general formula

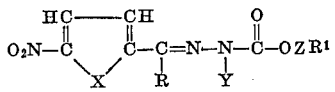

in which X, Y, Z, R and $R^1$ may take a variety of forms.

The valuable new compounds are those in which X is sulfur or oxygen (a chalcogen having an atomic number from 8 to 16); Y is hydrogen, alkyl containing up to about 12 carbon atoms, cycloalkyl containing from about 5 to 7 carbon atoms, phenyl, alkylphenyl or phenalkyl containing up to about 9 carbon atoms, or a mono- or disubstituted derivative of one of the named hydrocarbon radicals in which the substituents referred to may be hydroxy, nitro, chloro, bromo, or fluoro; Z is alkylene, containing up to about 5 carbon atoms in the alkylene chain and a total of up to about 10 carbon atoms; and R is hydrogen, lower alkyl, phenyl, furyl or thienyl.

$R^1$ may be one of the following groups: chloro, bromo, fluoro, hydroxy, lower alkanoyloxy, benzenesulfonyloxy or mono- lower-alkyl-substituted benzenesulfonyloxy; or instead, $R^1$ may be one of the following:

Carbamyloxy, mono- or di-lower-alkyl carbamyloxy, phenylcarbamyloxy, or mono- or disubstituted phenylcarbamyloxy, where the substituents referred to may be nitro or halo, preferably nitro, chloro or bromo;

Carbamyl, N-acetylcarbamyl, or mono- or disubstituted carbamyl where the substituents may be lower alkyl, phenyl, alkylphenyl or phenalkyl containing up to about 9 carbon atoms; or —O(CO)$R^2$, where $R^2$ is phenyl, furyl or thienyl, or a mono- or disubstituted derivative of one of these cyclic radicals in which the substituents may be lower alkyl, nitro, chloro, or bromo.

The novel compounds of this invention all exhibit valuable activity against a wide variety of microorganisms including Gram-positive and Gram-negative bacteria. Their surprisingly broad antimicrobial spectrum and high potency are seen, for example, in vitro tests against various organisms in a brain-heart infusion which simulates body fluids by virtue of its amino acid and peptide content.

The new compounds are effective against organisms responsible for urinary tract infections, and those in which $R^1$ is hydroxy, chloro or lower alkanoyloxy are especially useful in this application. Among the compounds which are particularly preferred are those in which X is oxygen and Y is hydrogen or alkyl, especially the β-hydroxyethyl-, the β-chloroethyl- and the β-acetoxyethyl-5-nitro-2-furfurylidene carbazates. In experimental infections in animals, oral administration of lower concentrations of these substances, of the order of 0.2–0.3% of the diet, has been found to eliminate bacteria from the kidney, bladder and urine. In some cases they are advantageously administered together with antibiotics, and their complementary effect on the antibacterial spectrum of the antibiotic is seen in tests of the biological activity of the urine after concurrent oral administration.

These compounds also demonstrate anti-trypanosomal activity, and some are surprisingly effective against these flagellated blood protozoa which produce disease in animals and man in many parts of the world. Significant activity is manifested against *T. equiperdum*, which causes dourine, a serious equine disease in the Western United States; *T. crusi*, which produces Chagas' disease, a South American affliction of man; and *T. congolense*, which is the cause of disease in cattle, horses, and other animals in Africa. The preferred compounds of this invention, in particular, β-hydroxyethyl-5-nitro-2-furfurylidene carbazate, exhibit high in vivo potency against these organisms by the oral as well as the subcutaneous routes of administration. In laboratory mice, they are often effective at levels of about 50–100 mg. per kg. body weight.

Those compounds in which $R^1$ is hydroxy or chloro also exhibit in vivo activity against various species of Salmonella, such as *S. gallinarum*, which causes fowl typhoid. Their efficacy can be demonstrated by artificially infecting day-old chicks with the organism by the oral route, and administering the compound mixed with the diet. After seven days' treatment, the surviving birds are sacrificed and the heart, spleen and liver recovered for determination of viable Salmonella organisms. A level of about 0.05% by weight of the medicament in a feed containing sufficient protein, carbohydrate, fat, vitamins and minerals to promote growth in healthy chicks will often be found to be effective in eliminating Salmonella from these organs.

The new compounds are also effective against other disease-producing organisms. In *Schistosoma mansoni* infections in mice, β-hydroxyethyl-5-nitro-2-furfurylidene carbazate is found to kill adult worms at levels of about 100 mg./kg. when administered subcutaneously over a period of time, say on ten successive days.

These novel products are readily prepared by methods well known to those skilled in the art. According to one convenient procedure:

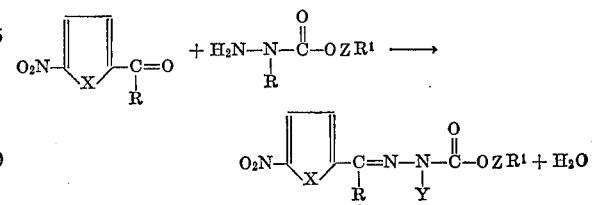

(where X, Y, Z, R and $R^1$ are as previously defined) a substituted carbazate is combined in approximately equimolar proportion with the appropriate 2-substituted 5-nitrofurane or 5-nitrothiophene, preferably in an inert solvent such as tetrahydrofuran or methanol. After several hours at room temperature condensation is usually substantially complete and the product may be isolated, for example, by evaporation of a portion of the solvent. Many of these products crystallize readily and may be further purified if desired by recrystallization from an appropriate solvent.

In the case where R¹ represents a primary hydroxyl group the products undergo the usual well-known substitution reactions of primary aliphatic alcohols, whereby the hydroxyl group may be replaced by another R¹ group. Thus, an alkanoyloxy group may be introduced by reaction with an acid anhydride, a urethane derivative may be formed by reaction with an isocyanate, or a chloro compound obtained by reaction with thionyl chloride. Such reactions are readily carried out employing substantially equimolar reactant proportions in a dry solvent. Where R¹ represents a primary halide grouping the products undergo the familiar substitution reactions of that class of compounds, whereby the halo group may be exchanged for another R¹ group.

The substituted carbazates required as intermediates in the preparation of these new products are readily obtained by a variety of methods. For example, they may be synthesized by the reaction of a hydrazino compound with a chlorocarbonate:

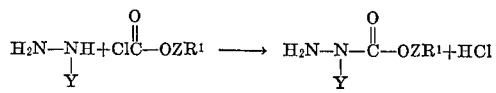

(where Y, Z and R' are as previously defined). Where Z is an ethylene or substituted ethylene group, an alternative attractive procedure for the preparation of the carbazate intermediate is the reaction of a carbonate of ethylene glycol or of an alkyl-substituted ethylene glycol with the appropriate hydrazino compound to form the corresponding β-hydroxyethyl carbazate. This reaction, which occurs spontaneously, is preferably conducted at about room temperature with cooling if required, in a solvent such as tetrahydrofuran or methanol. To insure completion of the reaction the mixture is usually allowed to stand for about 1–24 hours before proceeding. Without the necessity for isolating the intermediate, an approximately equimolar proportion of the 2-substituted 5-nitrofurane or 5-nitrothiophene may now be added for the preparation of the final product as previously described.

The low toxicity of these new compounds is illustrated by the fact that when β-hydroxyethyl 5-nitro-2-furfurylidene carbazate is administered daily for 30 days to dogs by the intravenous route at a level of 30 mg. per kg. body weight the animals show an essentially normal growth rate. Blood urea nitrogen, 30-minute bromsulphalein retention and urinalysis findings are essentially normal.

Many modes of administration of the new anti-infectives are possible, including oral, subcutaneous, intramuscular, intravenous and topical application, the choice being dictated by the type and severity of the infection. The compounds may be blended with pharmaceutical excipients such as starch, sugar, tapioca and the like, or dispersed in pharmaceutically acceptable liquids, including water, isotonic saline, oils such as sesame oil, aqueous glycols, sugar solution, and the like. Conventional coloring and flavoring materials may be added if desired. For treatment of urinary tract infections and trypanosomiasis oral administration of capsules or tablets, containing say 25–100 mg. of active ingredient, will usually be preferred from the standpoint of ease and convenience of administration. For administration to poultry in the treatment of Salmonella infections, the compounds may be admixed with feed to provide a concentration of at least about 0.001% and preferably 0.01% or more by weight of active ingredient.

In addition to the enumerated uses, these new compounds, by virtue of their broad antimicrobial spectrum, have other applications as well. For example, they may be employed as bacteriostatic agents on burns and surface wounds, and are useful in the treatment of infections due to sensitive organisms. For these applications, they may be applied in an ointment base, or in solution, suspension or emulsion in a non-toxic, pharmaceutically acceptable vehicle. These new substances are also useful in separating and classifying organisms for medical and diagnostic purposes, and in industrial fermentations, to prevent contamination by sensitive microorganisms.

The following examples are provided by way of illustration and should not be construed as limiting the invention, many variations of which are possible without departing from the spirit or scope thereof.

EXAMPLE I

A solution of ethylene carbonate (35.2 g., 0.4 mole) in dry tetrahydrofuran (400 ml.) is added dropwise during 2.5 hours to a solution of hydrazine (13.6 g., 95%) in dry tetrahydrofuran (400 ml.) at room temperature. A slightly exothermic reaction is observed. The solution is allowed to stand overnight at room temperature. 5-nitrofural (56.4 g., 0.4 mole) in tetrahydrofuran (400 ml.) is then added dropwise with stirring during 4 hours at room temperature. Stirring is continued for an additional 2 hours. The solution is then evaporated in a steam of nitrogen at room temperature to about 200–300 ml. and filtered to yield 80 g. of yellow β-hydroxyethyl 5-nitro-2-furfurylidene carbazate M.P. 161–163° (uncorrected); evaporation of the mother liquors and trituration with ether yield a second crop. After two recrystallizations from methanol the crystals melt at 165–167° (uncorrected), and analyze as follows.

Analysis.—Calculated for $C_8H_9O_6N_3$: C, 39.44%; H, 3.60%; N, 17.34%. Found: C, 39.51%; H, 3.73%; N, 17.28%. Two ultraviolet adsorption maxima are exhibited: 256 mμ (ε=9,700) and 356 mμ (ε=18,200).

EXAMPLE II

The product of Example I is subjected to standard in vitro plate tests on Difco nutrient agar (purchased from Difco Laboratories of Detroit) against various microorganisms. The cultures are grown in a sterilized synthetic medium having the following composition per liter of distilled water:

| | G. |
|---|---|
| $KH_2PO_4$ | 3 |
| $MgSO_4$ | 0.3 |
| NaCl | 0.5 |
| $NH_4Cl$ | 1 |
| $Na_2HPO_4 \cdot 12H_2O$ | 15 |
| Dextrose | 4 |

Employing standard serial dilution techniques, the minimum concentration of β-hydroxyethyl 5-nitro-2-furfurylidene carbazate necessary to inhibit organism growth for 24 hours at 37° C. is determined, with the following results:

| | Minimum inhibitory concentration, mcg./ml. |
|---|---|
| Proteus vulgaris | 25 |
| Escherichia coli | 25 |
| Aerobacter aerogenes | 12.5 |
| Pseudomonas aeruginosa | 12.5 |

EXAMPLE III

The product of Example I is evaluated in vitro against a variety of microorganisms grown in a brain-heart medium. The medium is prepared by adding 37 grams of dehydrated brain-heart infusion B37, purchased from Difco Laboratories, to a liter of distilled water and sterilizing the resulting solution in an autoclave. The compound under test is added to the brain-heart broth in various concentrations, up to 200 mcg. per ml., and the solutions are applied to agar plates seeded with one of the organisms.

Incubation for 24 hours at 37° C., gives the following results:

| | Minimum inhibitory concentration mcg./ml. |
|---|---|
| M. pyogenes var. aureus | 25 |
| M. pyogenes var. aureus 376 | 25 |
| M. pyogenes var. aureus 400 | 25 |
| S. pyogenes | 50 |
| S. facecalis | 100 |
| E. rhusiopathiae | 25 |
| C. diphtheriae | 6.3 |
| L. monocytogenes | 50 |
| B. subtilis | 25 |
| A. aerogenes | 50 |
| E. coli | 25 |
| S. typhosa | 100 |
| S. pullorum | 6.3 |
| S. gallinarum | 50 |
| K. pneumoniae | 25 |
| N. gonorrhoeae | 50 |
| H. influenzae | 100 |
| S. sonnei | 12.5 |
| E. amylovora | 100 |
| P. tumefaciens | 6.3 |
| D. desulfuricans | 100 |
| V. comma | 100 |
| P. multocida | 6.3 |
| Mycobacterium 607 | 50 |
| M. berolinense | 6.3 |

EXAMPLE IV

The product of Example I, both alone and in combination with oxytetracycline hydrochloride, is administered orally to rats. Urines are collected and assayed for bioactivity against E. coli, P. vulgaris and Ps. aeruginosa. Results are as follows:

| Compound | Dosage, mg./kg. | Sample Time, hrs. | Dilution Units | | |
|---|---|---|---|---|---|
| | | | E. coli | P. vulgaris | Ps. aeruginosa |
| Carbazate | 100 | 2 | 1:32 | 1:2 | 1:2 |
| | | 6 | 1:64 | 1:16 | 1:8 |
| Oxytetracycline | 100 | 2 | 1:32 | <1:1 | <1:1 |
| | | 6 | 1:128 | <1:1 | <1:1 |
| Carbazate plus oxytetracycline | 50+50 | 2 | 1:32 | 1:2 | 1:2 |
| | | 6 | 1:64 | 1:8 | 1:8 |

The complementary effect of the carbazate with the antibiotic is apparent.

EXAMPLE V

Urinary tract infection is established in rats by sewing into the bladder a zinc pellet irritant dipped in *Proteus vulgaris* culture. Treatment with β-hydroxyethyl 5-nitro-2-furfurylidene carbazate is instituted at once by adding the compound to the diet at a level of 0.3% by weight. After 12 days the treated animals are found to be free of infection, while the infection is well established in untreated controls.

EXAMPLE VI

Mice are experimentally infected with *Trypanosoma equiperdum* by intraperitoneal innoculation with 0.2 ml. of citrated saline suspension of peripheral blood containing approximately 60,000 trypanosomes. Untreated mice die of the infection within three to five days, the majority dying on the fourth day.

Immediately after inoculation a statistically significant number of mice are administered β-hydroxyethyl 5-nitro-2-furfurylidene carbazate subcutaneously at a level of 100 mg./kg. of body weight, and the treatment is repeated two more times at 24-hour intervals. In similar fashion other groups of infected mice are treated at various dosage levels and modes of administration. The mice are observed for 30 days, with the following results:

| | Administration | 30-day Survival Rate, Percent |
|---|---|---|
| Carbazate Dosage Level, mg./kg.: | | |
| 100 | Subcutaneous | 100 |
| 50 | do | 80 |
| 50 | Oral | 100 |
| 25 | Subcutaneous | 40 |
| 25 | Oral | 40 |

EXAMPLE VII

A typical poultry feed is prepared having the following composition:

| | Percent |
|---|---|
| Ground yellow corn | 51.28 |
| Soybean oil meal (51%) | 38.15 |
| Corn oil | 6.10 |
| Calcium carbonate | 1.20 |
| Dicalcium phosphate | 1.35 |
| Salt | 0.61 |
| Delmix (commercially available mineral mix containing $CaCO_3$ and small amount of iron, zinc, manganese and other salts—Limestone Products Corporation of New Jersey) | 0.1 |
| Vitamin A (5305 IU/lb.) | 0.1 |
| Vitamin $D_3$ (681 ICU/lb.) | 0.05 |
| Klotogen F (commercially available form of vitamin K—Abbott Laboratories) | 0.0003 |
| Pyridoxine hydrochloride | 0.0006 |
| D,L-methionine | 0.140 |
| Niacin USP | 0.0025 |
| Choline chloride (25%) | 0.2 |
| Riboflavin | 0.06 |
| Calcium Pantothenate (45%) | 0.002 |
| Myvamix (commercially available form of Vitamin E) | 0.05 |

The product of Example I is added to this feed to provide a composition containing 0.05% by weight of active ingredient. This composition is successfully employed in the treatment of chicks infected with *S. gallinarum*. At the conclusion of the experiment the birds are sacrified and the heart, spleen and liver found to be free of viable Salmonella.

EXAMPLE VIII

An acute intravenous toxicity study is made in male Swiss albino mice weighing 18 to 25 grams. The product of Example I is administered as a 1% solution in physiological saline and the $LD_{50}$ (lethal dose for 50% of the animals) is found to be approximately 311 mg./kg.

The carbazate is administered intravenously to rats at a level of 15 mg. per kg. body weight per day for 30 days. No deaths attributable to the drug are observed, and the weight gains of the treated rats compare favorably with those of a group of control rats.

The drug is also administered to dogs at a level of 30 mg. per kg. body weight per day for 30 days. No mortalities occur and the animals show an essentially normal growth rate. Blood urea nitrogen, 30-minute bromsulphalein retention and urinalysis findings are essentially normal.

EXAMPLE IX

A solution of 6.325 g. (0.026 mole) β-hydroxyethyl 5-nitro-2-furfurylidene carbazate in 150 ml. dry tetrahydrofuran is treated with 5 ml. thionyl chloride at room temperature. An exothermic reaction ensues. The reaction mixture is allowed to stand for several hours and then the solvent and excess thionyl chloride are evaporated in vacuum. The residue upon trituration with methanol yields 5.35 g. β-chloroethyl 5-nitro-2-furfurylidene carbazate in the form of pale yellow crystals melting at 203–206° C. The ultraviolet absorption spectrum exhibits peaks at 248–255 mμ and 355 mμ. Elemental analysis is as follows:

Analysis.—Calculated for $C_8H_8O_5N_3Cl$: C, 36.61%; H, 3.00%; N, 16.07%; Cl, 13.30%. Found: C, 36.74%; H, 3.08%; N, 16.06%; Cl, 13.58%.

EXAMPLE X

The product of Example IX is subjected to in vitro screening as described in Examples II and III. The minimum inhibitory concentration is found to be less than 6.3 mcg./ml. for the following organisms: *P. vulgaris*, *E. coli*, *Ps. aeruginosa*, *A. aerogenes*, and *P. ovale*. For *Strep. pyogenes* and *M. pyogenes* var. *aureus* 376 the minimum inhibitory concentration is found to be 100 mcg./ml.

The product of Example IX is likewise evaluated against *S. gallinarum* in chicks at the 0.05% level, as described in Example VII, with substantially equivalent results to those previously described therein.

EXAMPLE XI

The product of Example I (30.4 g., 0.125 mole) is treated with 78.5 ml. acetic anhydride in 750 ml. acetonitrile in the presence of 1 g. zinc chloride. After heating to dissolve the solids the reaction mixture is refluxed for 18 hours and then evaporated to a yellow solid under reduced pressure. Recrystallization from methanol-water provides 21.2 g. of 2-acetoxyethyl-5-nitro-2-furfurylidene carbazate melting at 153–4° C. After two additional recrystallizations from methanol elemental analysis is as follows: C, 41.48%; H, 3.37%; N, 14.39%; calculated for $C_{10}H_{11}O_7N_3$: C, 42.11%; H, 3.89%; N, 14.73%.

The product inhibits growth of the fungus *Trichophyton rubrum* at 100 mcg. per ml. It is administered orally to rats at 100 mg./kg. and the urines collected and assayed for bioactivity as in Example IV, with the following results:

|  | Dilution Units | | |
| --- | --- | --- | --- |
|  | E. coli | P. vulgaris | Ps. aeruginosa |
| Sample Time, hrs.: |  |  |  |
| 2 | 1:8 | 1:1 | <1:1 |
| 6 | 1:8 | >1:16 | 1:16 |

EXAMPLE XII

The product of Example I is treated with 3,5-dinitrobenzoyl chloride in pyridine at room temperature. Upon evaporation of the solvent β-(3,5-dinitrobenzoxy) ethyl 5-nitro-2-furfurylidene carbazate is recovered in the form of a crystalline solid melting at 192–195° C. The product is found to exhibit antimicrobial activity against a variety of microorganisms.

EXAMPLE XIII

The reaction of Example XII is repeated, substituting 5-nitro-2-furoyl chloride for the benzoyl chloride, and β-(5-nitro-2-furoyloxy) ethyl 5-nitro - 2 - furfurylidene carbazate is obtained in the form of crystals melting at 124–126° C. and exhibiting antimicrobial activity.

EXAMPLE XIV

The reaction of Example XII is repeated, substituting p-toluene-sulfonyl chloride in place of the benzoyl chloride. β-(toluenesulfonyloxy) ethyl 5 - nitro-2-furfurylidene carbazate melting at 130–135° C. is isolated from the reaction mixture. The product is found to exhibit antimicrobial activity against various microorganisms.

EXAMPLE XV

The product of Example I is treated in tetrahydrofuran solvent with 2,5-dichlorophenyl isocyanate at room temperature to form the urethane. β-(2,5-dichlorophenylcarbamlyoxy) ethyl 5-nitro-2-furfurylidene carbazate, melting at about 161° C., is isolated and found to have antimicrobial activity.

EXAMPLE XVI

β-Hydroxyisopropyl carbazate is prepared by the condensation of equimolar proportions of hydrazine and β-hydroxyisopropyl chloroformate. The carbazate is then treated with an equimolar proportion of 5-nitrofurfural, added dropwise as a 3.5% solution in tetrahydrofuran. After stirring for 6 hours the resulting solution is concentrated at room temperature to crystallize β-hydroxyisopropyl 5-nitro-2-furfurylidene carbazate.

β-Hydroxy-n-propyl 5-nitro-2-furfurylidene carbazate is prepared in analogous fashion by employing β-hydroxy-n-propyl chloroformate in place of β-hydroxyisopropyl chloroformate.

The two products exhibit activity against a variety of microorganisms. Other antimicrobial agents are derived from them by the reactions of Examples XI–XV.

EXAMPLE XVII

The β-hydroxypropyl 5-nitro-2-furfurylidene carbazates prepared in Example XVI are converted to the corresponding β-chloropropyl derivatives by the procedure of Example IX. These new compounds also have activity against microorganisms.

EXAMPLE XVIII

The preparation of Example II is repeated, substituting monomethylhydrazine for hydrazine, to obtain β-hydroxyethyl N - (5 - nitro-2-furfurylidene)-N'-methylcarbazate, melting at about 115–125° C. A series of further derivatives of this product is prepared by following the procedures of Examples IX and XI–XV. Activity against a variety of microorganisms is observed.

EXAMPLE XIX

The preparation of Example I is repeated, substituting 5-nitrothiophenecarboxaldehyde in place of 5-nitrofurfural, to obtain β-hydroxyethyl 5-nitro-2-thenylidene carbazate, which melts at about 145–165° C. Further derivatives of this substance are repeated by the reactions of Examples IX and XI–XV. The products exhibit antimicrobial activity.

EXAMPLE XX

The preparation of Example I is repeated, substituting β-hydroxyethyl hydrazine for hydrazine, to obtain β-hydroxyethyl N-(5-nitro-2-furfurylidene)-N'-β-hydroxyethyl carbazate. A series of further derivatives of this product is prepared by following the procedures of Examples IX and XI–XV. Activity against a variety of microorganisms is again observed.

EXAMPLE XXI

Following the hereinabove described procedures, the following compounds are prepared and found to have antimicrobial activity:

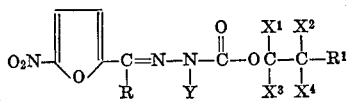

| Y | X¹ | X² | X³ | X⁴ | R | R₁ |
|---|---|---|---|---|---|---|
| n-C₃H₇ | CH₃ | CH₃ | H | H | H | —Cl |
| C₂H₅ | CH₃ | CH₃ | CH₃ | CH₃ | H | —O(CO)C₆H₅ |
| C₂H₅ | C₃H₇ | H | H | H | CH₃ | —O(CO)C:CHCCl:CClO |
| H | C₂H₅ | C₂H₅ | C₂H₅ | H | CH₃ | —F |
| H | i-C₃H₇ | i-C₃H₇ | H | H | C₂H₅ | —Br |
| C₂H₅ | H | H | H | H | C₂H₅ | —O(CO)NHCH₂ |
| H | H | H | H | H | CH₃ | —O(CO)NHC₆H₅ |
| H | H | H | H | H | n-C₃H₇ | —CONH₂ |
| H | H | H | H | H | n-C₃H₇ | —CONHC₃H₇ |
| H | H | H | H | H | C₂H₅ | —CON(CH₂C₆H₅) |
| n—C₁₂H₂₅ | C₂H₅ | C₂H₅ | C₂H₅ | C₂H₅ | i—C₃H₇ | —O(CO)CH₃ |
| —CH(CH₂)₃CH₂ | C₂H₅ | C₂H₅ | C₂H₅ | C₂H₅ | CH₃ | —O(CO)C₆H₃(CH₃)₂ |
| —CH(CH₂)₅CH₂ | n—C₈H₁₇ | H | H | H | CH₃ | —CONHC₆H₅ |
| —CH₂C₆H₅ | n—C₆H₁₃ | CH₃ | CH₃ | H | n—C₃H₉ | —CONHCOCH₃ |
| —CHCHCl(CH₂)₄CH₂ | i—C₄H₉ | i—C₄H₉ | H | H | i—C₄H₉ | —OCON(CH₃)₂ |
| H | H | n—C₄H₉ | H | n—C₄H₉ | s—C₄H₉ | —O(CO)—C:CHCH:CHO |
| —C₆H₄NO₂ | n—C₃H₇ | CH₃ | n—C₃H₇ | CH₃ | CH₃ | —OCO—C:CHCH:CHS |
| —CH₂C₆H₃Br₂ | H | H | H | H | CH₃ | —O(CO)—C:CHCH:CBrO |
| —C₆H₃(₂CH₅)Cl | H | H | H | H | CH₃ | O(CO)—C:CHCH:C(NO₂)S |
| —C₂H₅ | H | H | H | H | CH₃ | O(CO)—C:CHrCHr:CHS |
| —C₂H₅ | H | H | H | H | CH₃ | —O(CO)—C:C(CH₃)C(CH₃):CHO |

EXAMPLE XXII

The following additional antimicrobial agents are prepared by the described procedures:

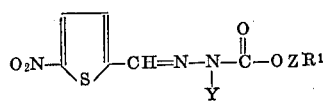

| Y | Z | R₁ |
|---|---|---|
| H | —CH(CH₃)CH(CH₃)— | —O(CO)C₂H₅ |
| CH₃ | —CH₂CH₂— | —O(CO)NHC₆H₅ |
| n-C₈H₁₇ | —CH₂CH₂— | o—O(CO)C₆H₄Cl |
| C₆H₅ | —C(CH₃)₂C(CH₃)₂— | —Br |
| H | —CH(C₈H₁₇)CH₂ | —F |
| H | —CH₂— | —OSO₂C₆H₅ |
| H | —C(CH₃)₂— | —O(CO)N(C₃H₇)₂ |
| —C₆H₂(CH₃)₃ | —C(C₂H₅)₂— | —O(CO)NHC₆H₄Cl |
| CH₃ | —CH₂C(CH₃)₂CH₂— | —CONHCOCH₃ |
| —CHCHOH(CH₂)₂CH₂ | —CH₂CH(C₂H₅)CH(C₂H₅)— | —CONHCH₃ |
| —CH(CH₂)₃CH₂ | —O(C₃H₇)₂CH₂CH₂— | —CONH(CH₂)₃C₆H₅ |
| —(CH₂)₃C₆H₅ | —(CH₂)₃— | —CONH₂ |
| —(CH₂)₃CH₂F | —(CH₂)₅— | —CON(C₆H₄CH₃)₂ |
| —CHCH₂(CHBr)₂CH₂CH₂ | —(CH₂)₃CH(CH₃)CH₂— | —OCONH₂ |
| n—C₁₂H₂₅ | —(CH₂)₂—CH(C₂H₅)(CH₂)₂— | —O(CO)C₆H₄NO₂ |
| CH₃ | —CH(C₃H₇)CH(C₂H₅)(CH₂)₃— | —O(CO)—C:CHCH:CClO |
| —C₆H₄(C₂H₄OH) | —CH(C₂H₅)CH(C₂H₅)(CH₂)₃— | —OCO—C:CClCCl:CHS |
| —CH(CH₂)₄CH₂ | —CH₂CHCH₃CHCH₃(CH₂)₂— | —OCO—C:CHC(NO₂):CHS |
| —(CH₂)₁₁CH₂Cl | —CH(C₃H₇)CH(C₃H₇)(CH₂)₂— | O(CO)—C:CHCH:C(C₈H₇)S |
| —(CH₂)₃C₆H₃(NO₂)₂ | —CH(C₂H₅)CH₂CH(C₂H₅)CH₂— | —CONH(C₆H₄)(C₃H₇) |
| —(CH₂)₁₁CH₂NO₂ | —CH₂CH(C₂H₅)(CH₂)₂— | —CON]C₆H₂(CH₃)₃[₂ |
| —CH₃ | —(CH₂)₃— | —O(CO)NHC₆H₃Br₇ |

EXAMPLE XXIII

The following compounds are prepared as previously described and are also found to possess activity against various microorganisms:

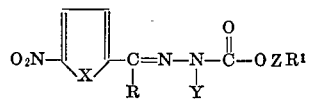

8. The compound of the formula

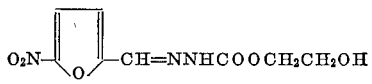

9. The compound of the formula

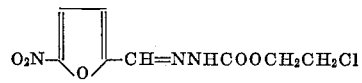

| X | Y | Z | R | $R_1$ |
|---|---|---|---|---|
| O | H | —CH₂CHCH₃CH₂— | H | —F |
| O | H | —(CH₂)₂CH(C₂H₅)— | H | —Br |
| O | H | —CH(C₃H₇)(CH₂)₂— | H | —O(CO)C:CHOCH:CH |
| O | —(CH₂)₃C₆H₅ | —CH₂CH(C₄H₉)CH₂— | CH₃ | m—O(CO)NHC₆H₄Br |
| O | —CH(CH₂)₂CHNO₂(CH₂)₂CH₂ | —CH(C₅H₁₁)(CH₂)₂— | CH₃ | —O(CO)C₃H₇ |
| S | H | —CH(C₃H₇)CH(C₄H₉)CH₂— | CH₃ | —OH |
| O | —CHBrCH₂Br | —C(C₃H₇)₂— | C₆H₅ | OSO₂(C₆H₄)C₃H₇ |
| O | H | —C(C₄H₉)₂— | n—C₃H₇ | —OCONH₂ |
| S | H | —(CH₂)₄— | H | —O(CO)NHC₆H₄NO₂ |
| S | i—C₃H₇ | —(CH₂)₂CH(CH₃)CH₂ | i—C₃H₇ | —CON(C₆H₅)₂ |
| O | CH₃ | —CH(C₃H₇)(CH₂)₃— | n—C₄H₉ | —O(CO)C₆H₃Cl₂ |
| O | —C₆H₃Cl₂ | —CH₂CHCH₃CHCH₃CH₂— | t—C₄H₉ | —O(CO)C₆H₄Br |
| O | H | —CH₂CH(C₃H₇)(CH₂)₃— | C₂H₅ | —CON(C₄H₉)₂ |
| O | CH₃ | —CH(C₄H₉)(CH₂)₄ | C₂H₅ | —CONHCH₂C₆H₅ |
| S | C₆H₅ | —CH₂CHCH₃CHCH₃CHCH₃CH₂— | H | —OCONHC₃H₇ |
| O | —C₆H₃(C₃H₇) | —C(C₃H₈)(C₅H₁₁)— | H | —O(CO)—C:C(C₃H₇)CH:CHO |
| O | —CH(CH₂)₂CHClCHCl | —CH(C₂H₅)CH(CH₃)CH(CH₃)(CH₂)₂— | H | —O(CO)—C:C(CH₃)C(CH₃):CHS |
| O | C₂H₅ | —(CH₃)₃— | —C:CHCH:CHS | —O(CO)—C:CHCH:CCIS |
| O | C₂H₅ | —(CH₂)₃— | —C:CHCH:CHO | —O(CO)—C:CHCH:CBrS |
| O | H | —(CH₂)₃ | H | —O(CO)C₆H₄C₃H₇ |

What is claimed is:

1. A compound of the formula

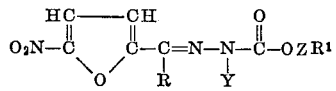

wherein Y is selected from the group consisting of hydrogen, alkyl and monohydroxyalkyl containing up to about 12 carbon atoms; Z is alkylene containing up to about 5 carbon atoms in the alkylene chain and a total of up to about 10 carbon atoms; R is selected from the group consisting of hydrogen and lower alkyl; and $R^1$ is selected from the group consisting of chloro; hydroxy; lower alkanoyloxy; benzenesulfonyloxy and mono-lower-alkyl benzenesulfonyloxy; carbamyl; carbamyloxy; mono- and di-lower-alkyl carbamyloxy; phenylcarbamyloxy; mono- and dichloro-phenylcarbamyloxy; and —O(CO)$R^2$ wherein $R^2$ is selected from the group consisting of phenyl, furyl, and mono- and dinitro derivatives of said cyclic radicals.

2. A compound of claim 1 wherein $R^1$ is selected from the group consisting of chloro, hydroxy, lower alkanoyloxy, benzenesulfonyloxy, and mono-lower-alkyl-benzenesulfonyloxy.

3. A compound of claim 1 wherein $R^1$ is carbamyl, carbamyloxy, mono-lower-alkyl carbamyloxy, di-lower-alkyl carbamyloxy, phenyl-carbamyloxy, mono-chloro-phenyl carbamyloxy, and dichloro-phenyl carbamyloxy.

4. A compound of claim 1 wherein $R^1$ is —O(CO)$R^2$ wherein $R^2$ is selected from the group consisting of phenyl, furyl, mono-nitro phenyl, di-nitro phenyl, mono-nitro furyl, and di-nitro furyl.

5. A compound of claim 1 wherein $R^1$ is hydroxy.

6. A compound of claim 1 wherein $R^1$ is chloro.

7. A compound of claim 1 wherein $R^1$ is lower alkonyloxy.

10. A compound of the formula

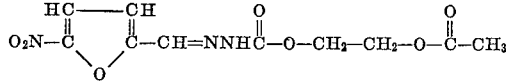

References Cited

UNITED STATES PATENTS

| | | | |
|---|---|---|---|
| 3,026,332 | 3/1962 | Holland | 260—347.3 |
| 2,742,462 | 4/1956 | Gever | 260—240 |

FOREIGN PATENTS

| | | |
|---|---|---|
| 1,013,287 | 8/1957 | Germany. |
| 192,407 | 10/1957 | Austria. |

OTHER REFERENCES

Chem. Abst. III, vol. 44, cols. 5372–3 (1950), Abstract of Takahashi et al., J. Pharm. Soc. Japan, vol. 69, pp. 284–9 (1949).

Eloy et al., Bull. Soc. Chim. Belgium, vol. 68, pp. 412, 416, 423 to 431 (1959).

Delaby et al., Comptes Rendus, vol. 246, pp. 3353–5 (1958).

Dann et al., Chem. Ber., vol. 82, pp. 83–87 (1949).

Rabjohn et al., J. Am. Chem. Soc., vol. 75, pp. 2259–2261 (1953).

JOHN D. RANDOLPH, Primary Examiner

U.S. Cl. X.R.

99—4; 260—332.2, 347.2, 347.3, 347.4, 471, 482; 424—275, 278